(12) United States Patent
Rao et al.

(10) Patent No.: US 11,132,223 B2
(45) Date of Patent: Sep. 28, 2021

(54) USECASE SPECIFICATION AND RUNTIME EXECUTION TO SERVE ON-DEMAND QUERIES AND DYNAMICALLY SCALE RESOURCES

(71) Applicant: NEC Laboratories America, Inc., Princeton, NJ (US)

(72) Inventors: Kunal Rao, Monroe, NJ (US); Yi Yang, Princeton, NJ (US); Srimat Chakradhar, Manalapan, NJ (US); Giuseppe Coviello, Princeton, NJ (US); Min Feng, Monmouth Junction, NJ (US); Murugan Sankaradas, Dayton, NJ (US)

(73) Assignee: NEC Corporation

( * ) Notice: Subject to any disclaimer, the term of this patent is extended or adjusted under 35 U.S.C. 154(b) by 37 days.

(21) Appl. No.: 16/809,192

(22) Filed: Mar. 4, 2020

(65) Prior Publication Data
US 2020/0293370 A1 Sep. 17, 2020

Related U.S. Application Data

(60) Provisional application No. 62/816,432, filed on Mar. 11, 2019.

(51) Int. Cl.
| G06F 9/46 | (2006.01) |
| G06F 9/48 | (2006.01) |
| G06F 9/50 | (2006.01) |
| G06F 9/30 | (2018.01) |
| G06F 9/4401 | (2018.01) |

(52) U.S. Cl.
CPC .......... *G06F 9/4881* (2013.01); *G06F 9/3009* (2013.01); *G06F 9/4418* (2013.01); *G06F 9/485* (2013.01); *G06F 9/5011* (2013.01)

(58) Field of Classification Search
CPC .... G06F 9/4881; G06F 9/3009; G06F 9/4418; G06F 9/485; G06F 9/5011
See application file for complete search history.

(56) References Cited

U.S. PATENT DOCUMENTS

| 2018/0150495 A1 | 5/2018 | Hoff et al. |
| 2018/0278675 A1 | 9/2018 | Thayer et al. |

OTHER PUBLICATIONS

Chardet et al., "Madeus: A formal deployment model", 2018 International Conference on High Performance Computing & Simulation (HPCS). Jul. 16, 2018. (pp. 724-731.).

(Continued)

*Primary Examiner* — Gregory A Kessler
(74) *Attorney, Agent, or Firm* — Joseph Kolodka

(57) ABSTRACT

A computer-implemented method includes obtaining a usecase specification and a usecase runtime specification corresponding to the usecase. The usecase includes a plurality of applications each being associated with a micro-service providing a corresponding functionality within the usecase for performing a task. The method further includes managing execution of the usecase within a runtime system based on the usecase and usecase runtime specifications to perform the task by serving an on-demand query and dynamically scaling resources based on the on-demand query, including using a batch helper server to employ the usecase specification to load dynamic application instances and connect the dynamic application instances to existing instances, and employ a batch helper configuration to load nodes/machines for execution of the on-demand query.

20 Claims, 12 Drawing Sheets

(56) References Cited

OTHER PUBLICATIONS

DiCosmo et al., "Aeolus: A component model for the cloud", Information and Computation. Dec. 1, 2014. vol. 239. (pp. 100-121).

Khoonsari et al., "Interoperable and scalable data analysis with microservices: applications in metabolomics", Bioinformatics. vol. 35, Issue 19. Oct. 1, 2019. (pp. 3752-3660.).

1100

Obtain a usecase specification and a usecase runtime specification corresponding to a usecase, the usecase including a plurality of applications each being associated with a micro-service providing a corresponding functionality within the usecase for performing a task
1110

Manage execution of the usecase within a runtime system based on the usecase and usecase runtime specifications to perform the task by serving an on-demand query and dynamically scaling resources based on the on-demand query
1120

Employ a batch helper server to implement the usecase specification to load dynamic application instances and connect the dynamic application instances to existing instances
1122

Employ the batch helper server to implement a batch helper configuration to load nodes/machines for execution of the on-demand query
1124

FIG. 11

USECASE SPECIFICATION AND RUNTIME EXECUTION TO SERVE ON-DEMAND QUERIES AND DYNAMICALLY SCALE RESOURCES

RELATED APPLICATION INFORMATION

This application claims priority to provisional application Ser. No. 62/816,432, filed on Mar. 11, 2019, incorporated by reference herein in its entirety.

BACKGROUND

Technical Field

The present invention relates to computer applications, and more particularly to usecase specification and runtime execution to serve on-demand queries and dynamically scale resources.

Description of the Related Art

Applications can act as micro-services providing specific functionalities used to solve problems. An instance of an application can be generated and run, which provides the micro-service associated with the application. If needed, multiple instances of the application can be generated that each process different input data.

SUMMARY

According to an aspect of the present invention, a computer-implemented method is provided. The method includes obtaining a usecase specification and a usecase runtime specification corresponding to the usecase. The usecase includes a plurality of applications each being associated with a micro-service providing a corresponding functionality within the usecase for performing a task. The method further includes managing execution of the usecase within a runtime system based on the usecase and usecase runtime specifications to perform the task by serving an on-demand query and dynamically scaling resources based on the on-demand query, including using a batch helper server to employ the usecase specification to load dynamic application instances and connect the dynamic application instances to existing instances, and employ a batch helper configuration to load nodes/machines for execution of the on-demand query.

In accordance with another embodiment of the present invention, a system is provided. The system includes a memory device for storing program code and at least one processor device operatively coupled to the memory device. The at least one processor device is configured to execute program code stored on the memory device to obtain a usecase specification and a usecase runtime specification corresponding to the usecase. The usecase includes a plurality of applications each being associated with a micro-service providing a corresponding functionality within the usecase for performing a task. The at least one processor device is further configured to manage execution of the usecase within a runtime system based on the usecase and usecase runtime specifications to perform the task by serving an on-demand query and dynamically scaling resources based on the on-demand query by using a batch helper server to employ the usecase specification to load dynamic application instances and connect the dynamic application instances to existing instances, and employ a batch helper configuration to load nodes/machines for execution of the on-demand query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 11 is a block/flow of a system/method for managing execution of a usecase, in accordance with an embodiment of the present invention.

DETAILED DESCRIPTION OF PREFERRED EMBODIMENTS

The embodiments described herein provide for a runtime system that can combine a plurality of applications associated with respective micro-services as "building blocks" into a single entity, referred to herein as a usecase, to perform a task (e.g., a higher-level real-time/batch task) and/or solve a complex problem upon execution. Each micro-service may provide a corresponding functionality within the usecase, and an application instance can be generated and/or run to provide the corresponding micro-service. A usecase in accordance with the embodiments described herein can be run on, e.g., an edge device, a server, a cloud device, or any combination thereof. More specifically, the embodiments described herein can provide for a runtime system that builds a usecase specification and a usecase runtime specification, and manages execution of the usecase based on these specifications to serve an on-demand query and dynamically scale resources based on the on-demand query. The runtime system described herein can cleanly stop and terminate execution of the entire usecase, including its child instances and any connections between them.

Figure 1:
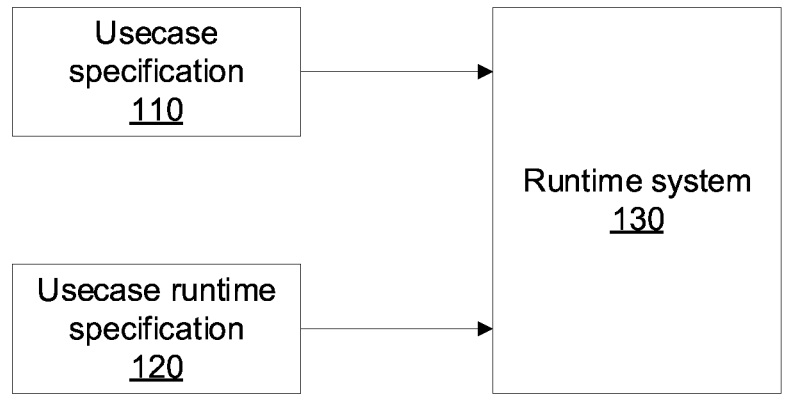
FIG. 1 is a diagram of a high-level overview of a system/method for specifying a usecase specification, a usecase runtime specification, and managing usecase execution, in accordance with an embodiment of the present invention.

Referring now in detail to the figures in which like numerals represent the same or similar elements and initially to FIG. 1, a block/flow diagram is provided illustrating a high level overview of a system/method 100 for specifying a usecase specification, a usecase runtime specification, and managing usecase execution.

As shown, a usecase specification 110 and a usecase runtime specification 120 are obtained by a runtime system 130. As will be described in further detail below with reference to FIG. 2, the usecase specification 110 may specify usecase details including, but not limited to, applications that are included in the usecase, instances for execution of the usecase, how the instances should be spawned, connections between the various instances, configuration of individual instances and nodes/machines on which they should run, etc. As will be described in further detail below with reference to FIG. 3, the usecase runtime specification 120 may specify details regarding the execution of a usecase including, but not limited to, a usecase identifier (ID) for the instance of the usecase that needs to be generated, a unique name of the usecase instance, a node/machine which initiates execution of the usecase, and a configuration for the entire usecase.

The runtime system 130 can manage execution of the usecase based on the specifications 110 and 120. The runtime system 130 can manage execution of individual applications by combining or stitching multiple micro-services in a manner such that a larger problem can be solved by solving smaller problems with the individual applications working together and talking to each other. The runtime system 130 can cleanly stop and terminate execution of the entire usecase, including its child instances and any connections between them. Additionally, the runtime system 130 can provide fault tolerance in the event of abrupt disruption of usecase execution. More specifically, if for any reason the usecase execution abruptly stops or fails (e.g., power goes down), then, when the runtime system comes back up, the runtime system does not need to generate duplicate child instances. Instead, the runtime system can resume operation by reusing previously existing instances. Further details regarding management of usecase execution by the runtime system 130 will be described below with reference to FIG. 4.

Figure 2:
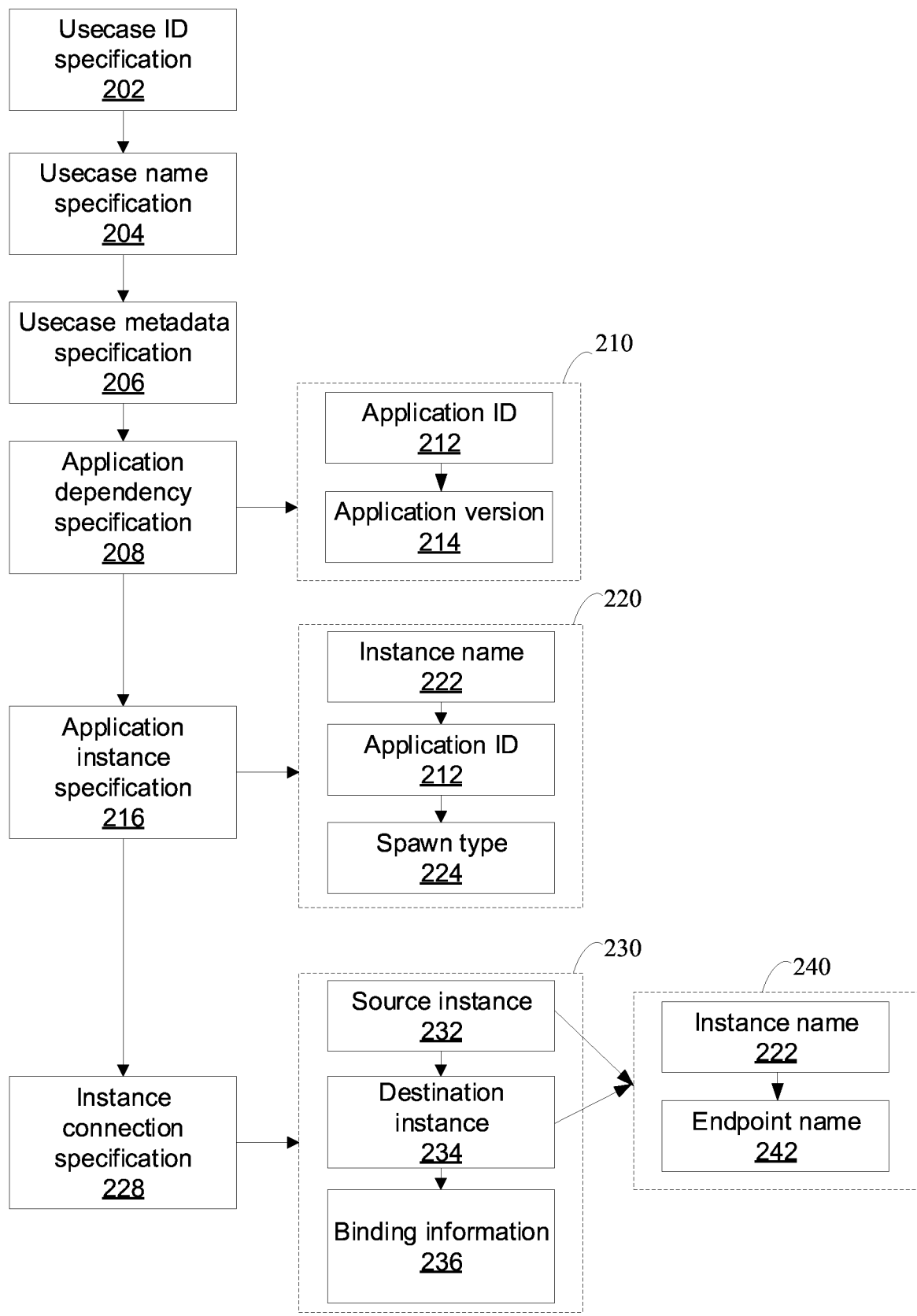
FIG. 2 is a diagram of a usecase specification, in accordance with an embodiment of the present invention.

With reference to FIG. 2, a diagram is provided illustrating a usecase specification 200. As described above, the usecase can include a plurality of applications associated with respective micro-services to perform a task. Each micro-service may provide a corresponding functionality, and an instance of an application can be generated and/or run to provide the corresponding micro-service. The usecase specification 200 can be generated to serve on-demand queries and dynamically scale resources.

The usecase specification 200 may specify usecase details including, but not limited to, applications that are included in the usecase, instances for execution of the usecase, how the instances should be spawned, connections between the various instances, configuration of individual instances and nodes/machines on which they should run, etc. More specifically, as shown in FIG. 2, the usecase specification 200 can include a usecase identifier (ID) specification 202 specifying a usecase ID for a usecase, a usecase name specification 204 specifying a name for the usecase, and a usecase metadata specification 206 specifying other metadata related to the usecase.

The usecase ID can be used internally to refer to the usecase, which can include a plurality of applications. The other metadata can include the version number of the usecase, any description associated with the usecase, a universal resource identifier (URI) or universal resource locator (URL) where more details related to the usecase can be found, the operating system (OS) and architecture on which the usecase runs, the maintainer of the usecase, and any other relevant metadata pertaining to the usecase.

The usecase specification 200 can further include application dependency specification 208. As mentioned above, the usecase can include a plurality of applications. The applications that constitute the usecase can be specified after the usecase ID, usecase name and usecase metadata are provided.

In one embodiment, the plurality of applications can include a special "batch helper" application. The batch helper application can be specified for the usecase to serve on-demand queries and dynamically scale resources.

Each application can be associated with a set of application metadata 210. As shown, the set of application metadata 210 can include an application ID 212 that internally refers to the application, and an application version 214 that corresponds to the version of the application that is used as part of the usecase.

An application can include one or more instances that run and provide the corresponding micro-service(s) for which the application is designed. The usecase specification 200 can further include an application instance specification 216 specifying the one or instances of the application. There can be a plurality of instances of an application, if the usecase requires them. Each instance of an application may act upon different input data.

Each instance can be associated with a set of instance metadata 220. The set of instance metadata 220 can include an instance name 222, the application ID 212 to which the instance belongs to, and a spawn type 224 of the instance. The spawn type 224 refers to the way the runtime system should generate and spawn the corresponding instance.

One of a plurality of spawn types can be specified for an instance. Non-limiting examples of spawn types that can be specified for an instance include "New", "Reuse", "Dynamic", "UniqueSiteWide", and "UniqueNodeWide".

If the New spawn type is specified for an instance, the runtime system will always generate a new instance. If the Reuse spawn type is specified for an instance, the runtime system will first check if there are any other instances already running with the same configuration. If so, the runtime system will reuse that instance during execution of the usecase. Otherwise, a new instance can be generated by the runtime system. If the Dynamic spawn type is specified for an instance, the runtime system will not generate the instance when the usecase starts. Instead, the instance will be dynamically generated on-demand after the usecase execution has begun. If the UniqueSiteWide spawn type is specified for an instance, the runtime system will generate a single instance across the entire site wide deployment. If an instance is already running, then the runtime system will use that instance during execution of the usecase. Otherwise, a new instance is generated and started. If the UniqueNodeWide spawn type is specified for an instance, the runtime system will generate a single instance on the particular node/machine where the instance will be run. The node/machine may be specified during execution of the usecase. If there is another instance already running on the specified node/machine that matches the instance configuration, the runtime system will use that instance during execution of the usecase. Otherwise, a new instance is generated and started.

For usecases serving on-demand queries and dynamically scaling resources, an instance of "batch helper" can be specified with the New spawn type. Moreover, instances having a Dynamic spawn type can be generated and started to serve on-demand queries and dynamically scale resources when the request is received. The batch helper can provide at least some of the following functionality as part of the runtime system:

(1) Job management (e.g. management of on-demand query execution), which can require one or more dynamic instances to be generated and executed. The batch helper can consider each dynamic instance to be a job.
(2) Creation of dynamic instances of applications along with their associated configurations.
(3) Dynamic scaling of resources as per the need of the query.
(4) Resource management and automatic scheduling for dynamic instances;
(5) Assignment of node/machine where the dynamic instance should be run;
(6) Connection between dynamic instances and other instances within the topology;
(7) Termination of execution of dynamic instances;
(8) Deletion of dynamic instances; and
(9) Status querying of dynamic instances.

The usecase specification 200 can further include an instance connection specification 228 specifying connections between various instances of the applications. The connections can define the way micro-services connect and talk to each other, such that output provided by a particular micro-service is passed on as input to the next micro-service. Various micro-services may be connected, and a topology of these micro-services may be generated, thereby forming the entire usecase.

For usecases serving on-demand queries and dynamically scaling resources, connections can be specified between: (1) Instances that want to generate dynamic instances and the batch helper; (2) Dynamic instances spawned during usecase execution and the batch helper; and (3) Dynamic instances and other instances (e.g., generated at start of usecase execution ("static") or generated after the start of the usecase execution) in the topology.

Each connection can be associated with a set of connection metadata 230. The set of connection metadata 230 can include a source instance 232, a destination instance 234, and binding information 236. Communication between instances may be done over a suitable message queue and/or over application programming interfaces (APIs) (e.g., HTTP(S)-based RESTful APIs), where the binding information 236 can tell the runtime system which instance binds and which instance needs to connect and obtain the necessary input data. For example, one suitable message queue is be provided by ZeroMQ, which is an open-source high-performance asynchronous messaging library. Unlike message-oriented middleware, ZeroMQ can be run without a dedicated message broker. For the source instance 232 and the destination instance 234, the instance name 222 and the endpoint name 242 to be used during connection can be specified. Accordingly, the usecase specification 200 described above can be used to identify various applications, their instances and connections that need to be made across various instances for the entire usecase to build and run.

The usecase specification 200 can be used as an input to compile the usecase and generate a binary package of the usecase in order to, e.g., serve on-demand queries and dynamically scale resources. To generate the binary package, each application in the usecase can be compiled one-by-one to generate its binary package based on the set of application metadata 210 (e.g., application ID 112 and application version 214).

A unified configuration of the usecase can be generated as a combination of the configuration of each instance to be launched in runtime based on the set of instance metadata 220 (e.g., instance name 222, application ID 212 and spawn type 224). A sample configuration of the usecase can be generated as a combination of the sample configuration of each instance to be launched in runtime based on the set of instance metadata 220 (e.g., instance name 222, application ID 212 and spawn type 224). A package of the usecase including the binary packages, unified configuration and the sample configuration can be generated.

For example, if the usecase specification 200 includes any instance with a Dynamic spawn type, then the batch helper application can be added as part of the usecase and an instance of the batch helper can be added along with other application instances. A batch helper configuration can be added to the unified configuration of the usecase, and a sample configuration of the batch helper can be added in the sample configuration of the usecase.

Figure 3:
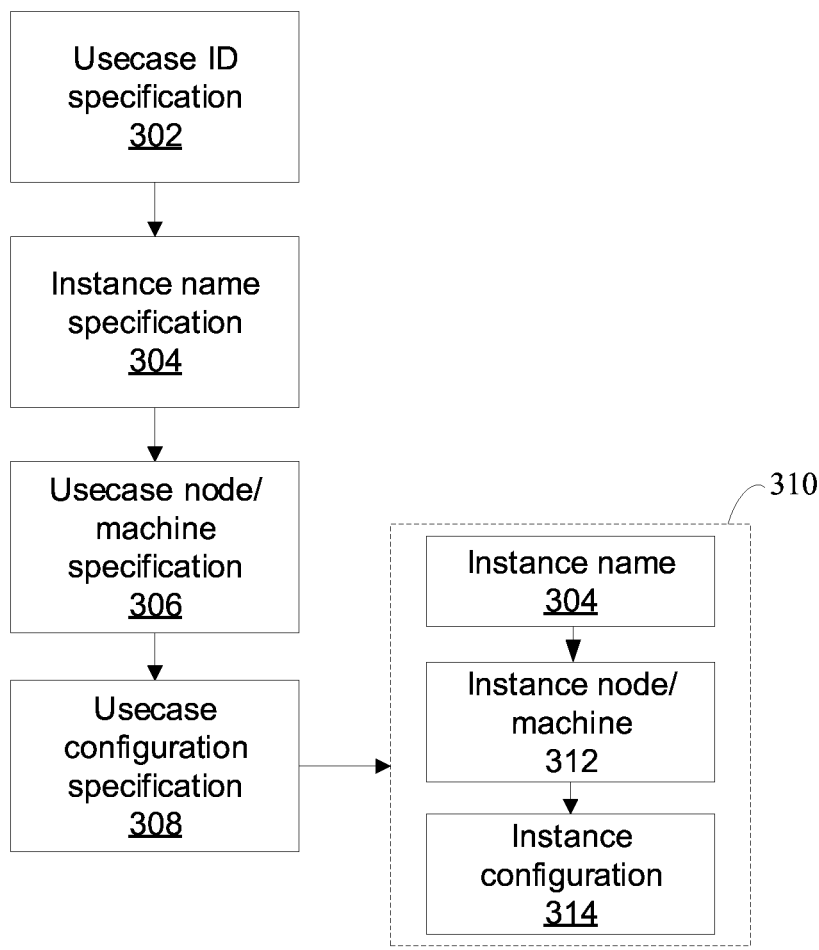
FIG. 3 is a diagram of a usecase runtime specification, in accordance with an embodiment the present invention.

With reference to FIG. 3, a diagram is provided illustrating a usecase runtime specification 300. The usecase runtime specification 300 may specify details regarding the execution of a usecase. For example, the usecase runtime specification 300 can be used to serve on-demand queries and dynamically scale resources.

More specifically, as shown, the usecase runtime specification 300 can include a usecase identifier (ID) specification 302 that specifies the usecase ID for the instance of the usecase that needs to be generated, an instance name specification 304 that specifies the unique name of the usecase instance, a usecase node/machine specification 306 that specifies the node/machine which initiates execution of the usecase, and a usecase configuration specification 308 that specifies the configuration for the entire usecase.

The usecase configuration specification 308 can be associated with the configuration for each instance belonging to the usecase. For example, the configuration of each instance can be based on a set of configuration metadata 310 include the instance name 304, the instance node/machine 312 on which the instance needs to be started, and the instance configuration 314 of the instance itself.

As mentioned above with reference to FIG. 2, a special batch helper application instance can be provided to serve on-demand queries and dynamically scale resources as per the need of the query. The batch helper instance can be started by the runtime system to handle dynamic instances. As part of the configuration of batch helper instance, one or more nodes/machines on which batch helper can automatically schedule execution of dynamic instances can be specified. Once a runtime system has the usecase specification and the usecase runtime specification, such as those described above with reference to FIGS. 1-3, the runtime system can commence a runtime execution procedure for building, generating and executing the usecase. Further details regarding the runtime execution procedure will now be described below with reference to FIG. 4.

Figure 4:
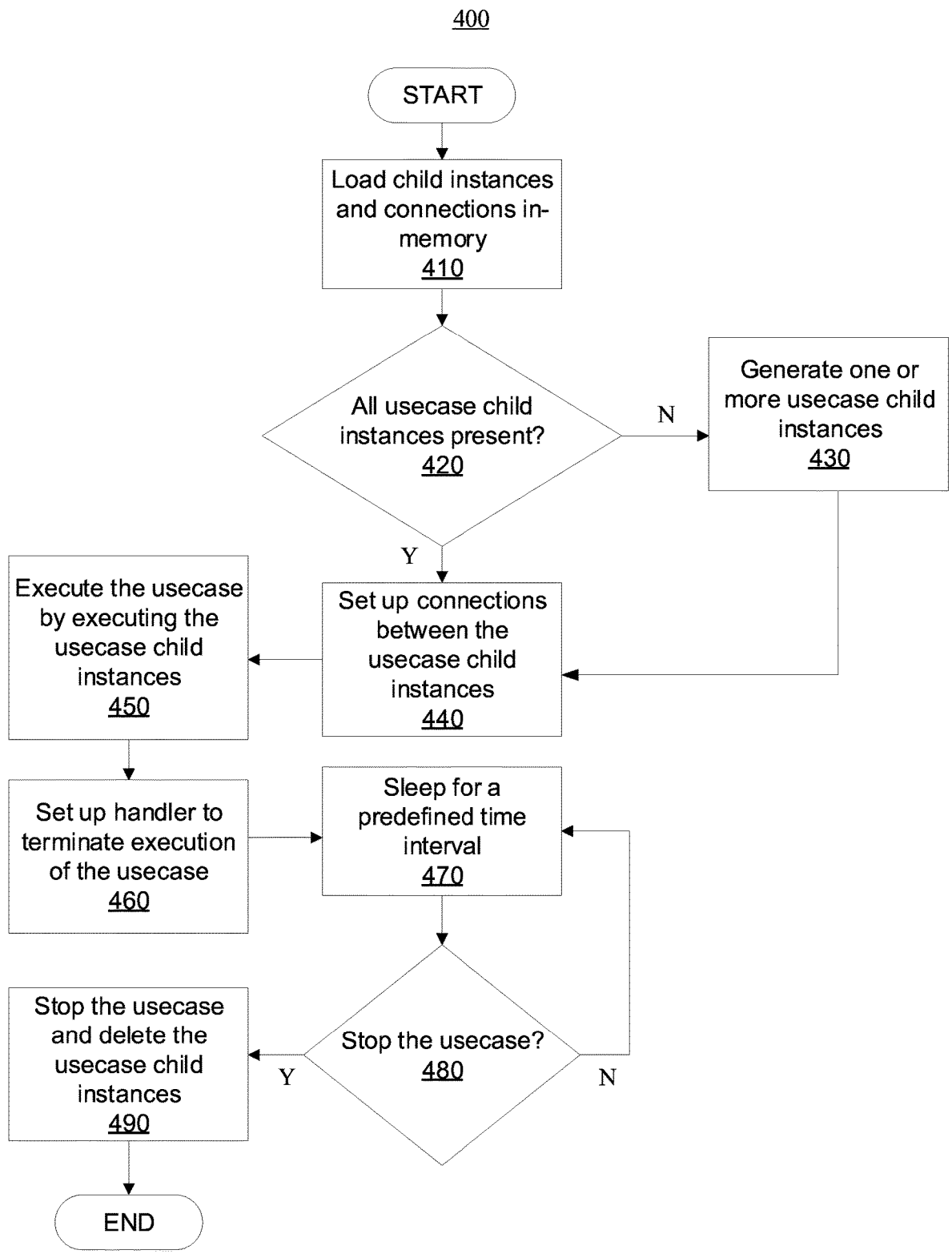
FIG. 4 is a block/flow diagram of a system/method for implementing a runtime usecase execution procedure, in accordance with an embodiment of the present invention.

With reference to FIG. 4, a block/flow diagram is provided illustrating a system/method 400 for managing execution of a usecase at runtime to perform a task. A runtime system, such as the runtime system 130 of FIG. 1, can build and execute the usecase using the usecase specification and usecase runtime specification corresponding to the usecase.

For example, execution of the usecase can serve on-demand queries and dynamically scale resources. More specifically, as will be described in further detail below with reference to FIG. 7, a batch helper execution procedure implemented by a batch helper instance can be used to serve on-demand queries and dynamically scale resources.

At block 410, once the runtime system receives the inputs, the application or child instances and their connections are read and loaded in-memory. After the instances and connections are loaded in-memory, the runtime system can begin to build the usecase for execution and generate the necessary child instances. More specifically, building the usecase can include obtaining usecase child instances for building the usecase. The system/method 400 can reuse existing usecase child instances if the configuration of instances matches with an existing instance of the application, if the configuration of the instances matches the node/machine on which they should run, etc. Thus, at block 420, it is determined whether all usecase child instances are present. For example, the runtime system can check a database for any previously generated child instances that already exist for the usecase. This can be part of fault tolerance provided by the runtime system in the event of abrupt disruption of usecase execution. More specifically, in response to the execution of the usecase abruptly stopping or failing (e.g., power goes down), then, when the runtime system comes back up, the runtime system does not need to generate duplicate child instances. Instead, the runtime system can resume operation by reusing previously existing child instances.

If all the usecase child instances are present, no child instances need to be generated. Otherwise, the runtime system can generate one or more usecase child instances at block 430. The usecase child instances can be generated at block 430 by iterating over all the usecase child instances and generating them one-by-one. Further details regarding the generation of usecase child instances at block 430 will now be described below with reference to FIG. 5.

Figure 5:
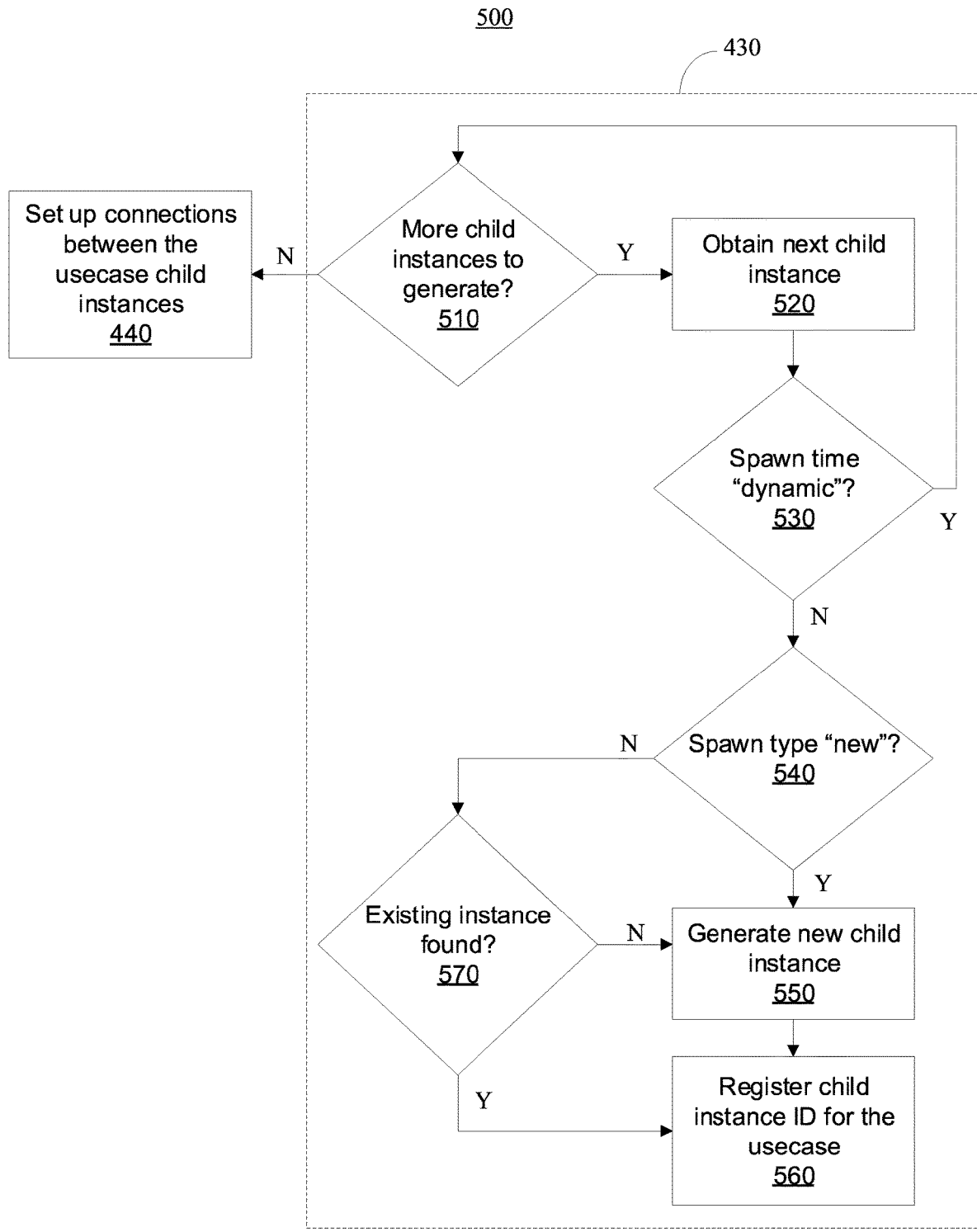
FIG. 5 is a block/flow diagram of a system/method for generating child instances during runtime execution, in accordance with an embodiment of the present invention.

With reference to FIG. 5, a block/flow diagram is provided illustrating an exemplary system/method 500 for generating usecase child instances at block 430 of FIG. 4.

At block 510, the runtime system determines whether there are more child instances to generate. For example, the runtime system can check in a database if the child instances were generated previously and already exist for the usecase. If not, connections between the child instances are set up at block 440, as described above with reference to FIG. 4.

Otherwise, at block 520, a next child instance is obtained and, at block 530, the runtime system determines whether the spawn type of the next child instance is "dynamic". If so, the generation of the next child instance is skipped, and the process reverts back to block 510 to determine if any other child instances are left to generate.

Otherwise, at block 540, the runtime system determines whether the spawn type of the next child instance is "new". If so, the runtime system generates a new child instance for the next child instance at block 550 and registers the child instance ID for the usecase at block 560. The child instance ID can be registered in the database for the usecase.

If the spawn type is not "new", the runtime system determines if an instance that can be used already exists at block 570. If the spawn type is "reuse", then the runtime system can check if there is another existing instance of this application with the same configuration required by this instance. If so, then it uses that instance. If the spawn type is "uniqueSiteWide", then the runtime system checks if another instance of this application already exists. If so, it reuses that instance. If the spawn type is "uniqueNodeWide", then the runtime system can check if there is already an instance of this application with the same configuration on the node/machine that the instance is supposed to run on. If there is one, then the runtime system uses that instance.

The runtime system can then register the child instance ID for the usecase at block 560. If an existing instance of this application is not found, the runtime system can generate a new child instance for the next child instance at block 550 and register the child instance ID for the usecase at block 560. The process of FIG. 5 can be iterated until there are no more child instances to be generated.

Referring back to FIG. 4, after block 420 or block 430, connections between the child instances can be set up at block 440 by stitching the usecase child instances together so that they can talk to each other. The runtime system can iterate over all the connections and set the connections one-by-one. After the connections are set up at block 440, the runtime system may execute the usecase by executing the usecase child instances at block 450. Since the usecase child instances are connected and thus work together and talk to each other, each usecase child instance may start producing its result or output and can provide the output as an input to the connected usecase child instance, and the entire usecase can be set into action by the runtime system. Further details regarding the setting up of connections between the usecase child instances at block 440 will be described below with reference to FIG. 6.

Figure 6:
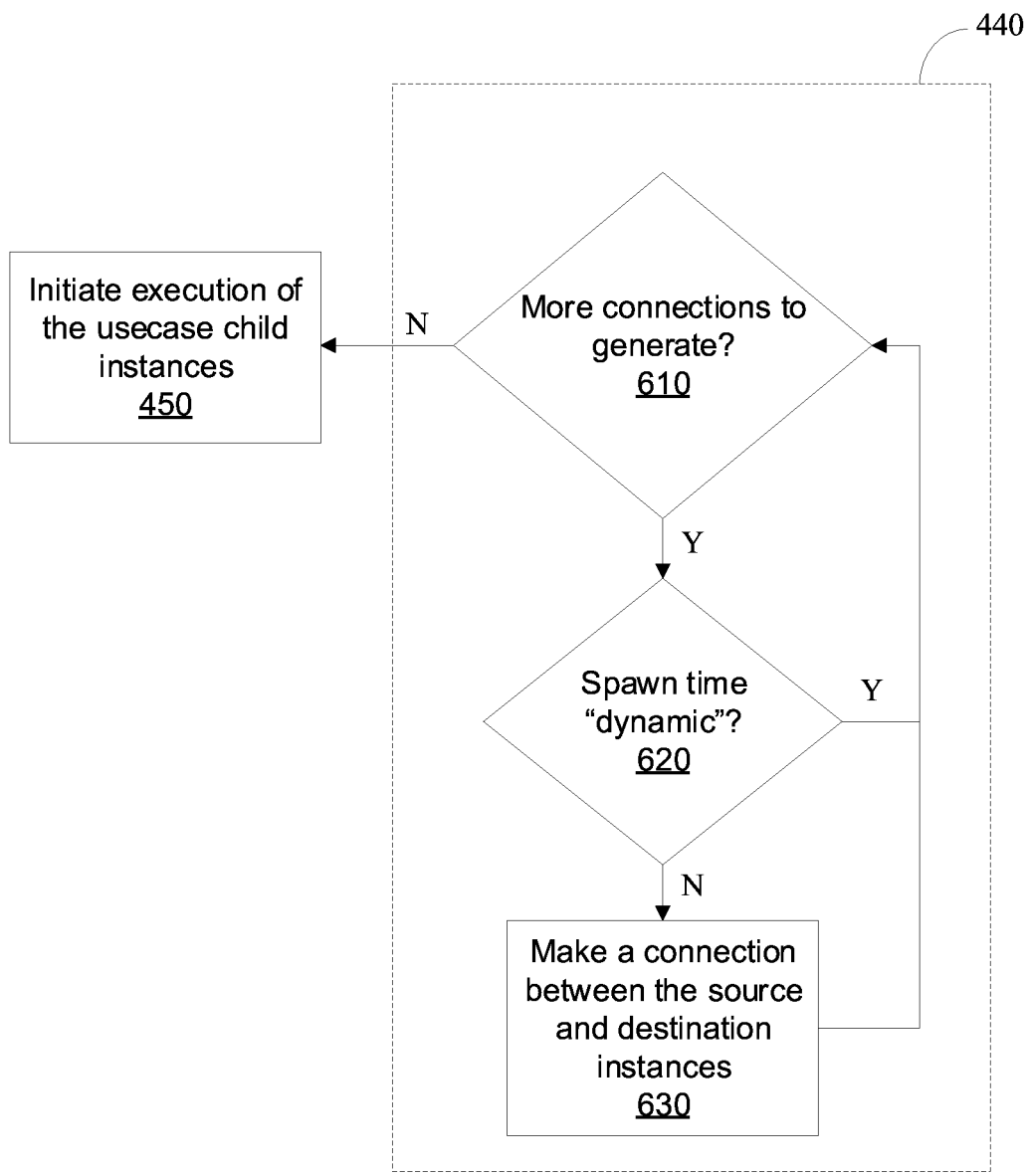
FIG. 6 is a block/flow diagram of a system/method for setting up connections during runtime execution, in accordance with an embodiment of the present invention.

With reference to FIG. 6, a block/flow diagram is provided illustrating an exemplary system/method 600 for setting up connections between the usecase child instances at block 440 of FIG. 4.

At block 610, it is determined if there are more connections to generate. If not, execution of the usecase child instances is initiated at block 450, as described above with reference to FIG. 4.

Otherwise, at block 620, it is determined whether the source/destination instance for the connection has a spawn type of "dynamic". If so, then the connection is skipped and the process reverts back to block 610 to determine if there is a next connection to generate. If the spawn type is not "dynamic", then the runtime system can make a connection between the source and destination instances at block 630. While making the connection, the runtime system can check whether the source/destination binds and then make the connection accordingly. The instance name and endpoint name from the usecase specification may be used by the runtime system while making the connection between the source and destination instances.

Referring back to FIG. 4, at block 460, the runtime system sets up a handler to terminate execution of the usecase. The handler is set up to receive a signal to stop the usecase. For example, the handler can be set up to receive a signal including a SIGTERM signal. A SIGTERM signal is a generic signal that can be sent to a process to request its termination. Unlike a SIGKILL signal, which immediately terminates or kills a process, the SIGTERM signal can be blocked, handled and ignored by the process.

At block 470, the runtime system is put to sleep for a predefined time interval. The predefined time interval can be initially set as a default time interval, and may be configurable and set by the user. The predefined time interval can be on the order of seconds. For example, the default time interval can be set at, e.g., 10 seconds.

After the runtime system wakes up after the predefined time interval, at block 480, the runtime system determines whether it should stop the usecase. More specifically, the runtime system determines whether it has received the signal to stop the usecase.

If the runtime system determines that it should stop the usecase instance, the runtime system can stop the usecase and delete the child instances at block 490, and the process ends. Stopping the child instances may include deleting the child instances. Otherwise, the process can revert back to block 470 to put the runtime system to sleep for a predefined time interval (which could be the same or different from the previously defined predefined time interval).

Figure 7:
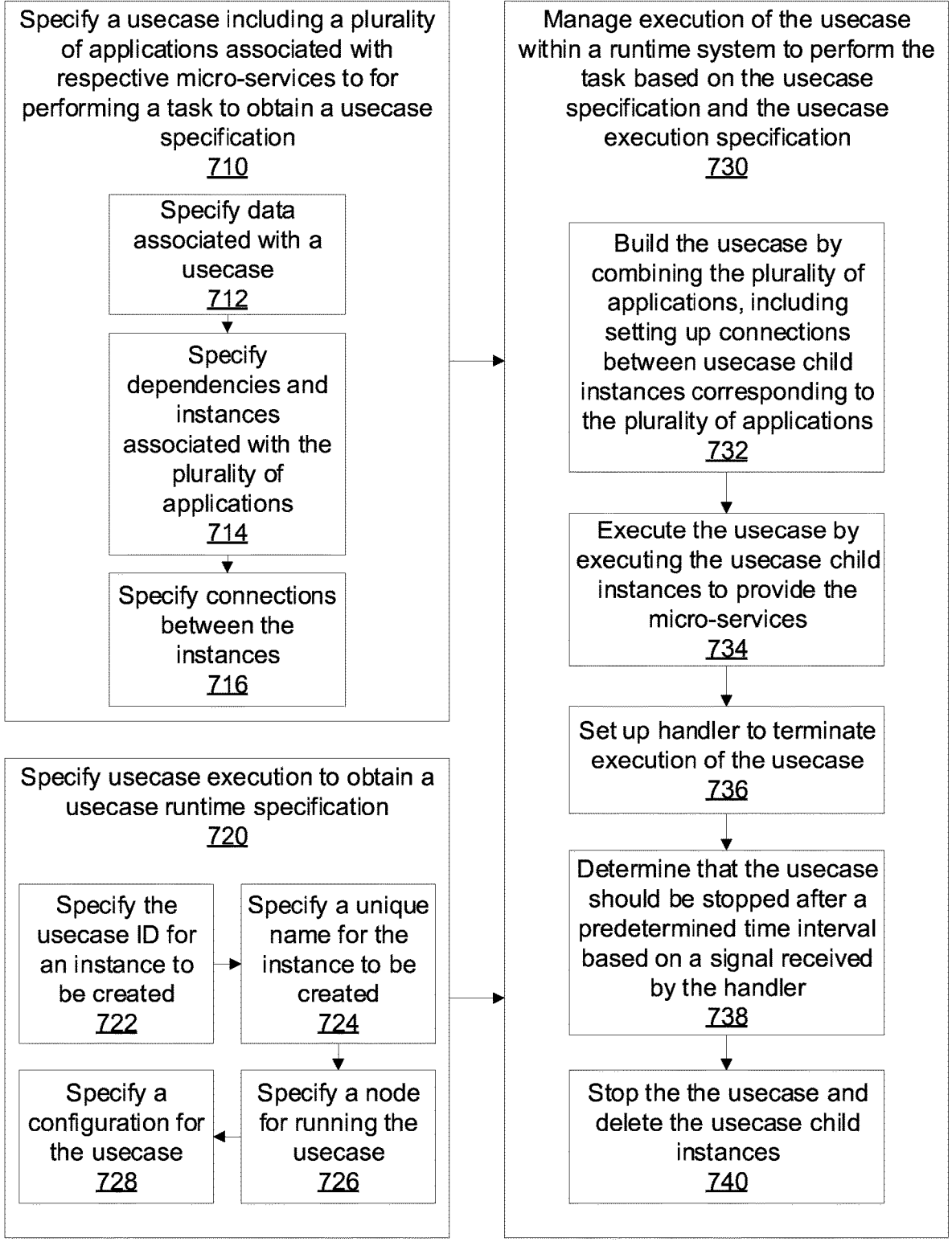
FIG. 7 is a block/flow diagram of a system/method for specifying a usecase, specifying usecase execution, and managing execution of a usecase, in accordance with an embodiment of the present invention.

With reference to FIG. 7, a block/flow diagram is provided illustrating a system/method 600 for specifying a usecase, specifying usecase execution, and implementing a runtime usecase execution procedure.

At block 710, a usecase including a plurality of applications associated with respective micro-services is specified for performing a task to obtain a usecase specification. Each micro-service can provide a corresponding functionality within the usecase to perform a task. The usecase specification can be used to identify various applications, their instances and connections that need to be made across various instances for the entire usecase to build and run.

More specifically, specifying the usecase may include, at block 712, specifying data associated with a usecase. The data associated with the usecase may include an identifier (ID), a name and other metadata associated with the usecase.

Specifying the usecase may further include, at block 714, specifying dependencies and instances associated with the plurality of applications and, at block 716, specifying connections between the instances. The connections can define the way micro-services connect and talk to each other, such that output provided by a particular micro-service is passed on as input to the next micro-service. Various micro-services may be connected, and a topology of these micro-services may be generated, thereby forming the entire usecase.

The usecase specification can be used as an input to compile the usecase and generate a binary package of the usecase. To generate the binary package, each application in the usecase can be compiled one-by-one to generate its binary package based on the set of application metadata (e.g., application ID and application version).

A unified configuration of the usecase can be generated as a combination of the configuration of each instance to be launched in runtime based on the set of instance metadata (e.g., instance name, application ID and spawn type). A sample configuration of the usecase can be generated as a combination of the sample configuration of each instance to be launched in runtime based on the set of instance metadata (e.g., instance name, application ID and spawn type). A package of the usecase including the binary packages, unified configuration and the sample configuration can be generated.

Further details regarding blocks 710-716 are described above with reference to FIG. 2.

At block 720, a usecase execution is specified to obtain a usecase runtime specification. The specification of the usecase execution can be based on the usecase specification.

More specifically, specifying the usecase execution may include, at block 722, specifying the usecase ID for an instance to be generated.

Specifying the usecase execution may further include, at block 724, specifying a unique name for the instance to be generated.

Specifying the usecase execution may further include, at block 726, specifying a node for running the usecase.

Specifying the usecase execution may further include, at block 728, specifying a configuration for the usecase.

Further details regarding blocks 720-728 are described above with reference to FIG. 3.

At block 730, execution of the usecase within a runtime system is managed to perform the task based on the usecase specification and the usecase runtime specification.

Using the usecase and usecase runtime specifications, a runtime system can obtain information including, but not limited to, which applications constitute the usecase, how many and which instances of the applications are to be generated and started, what are the instance configurations, where to run the instances and what are the connections between the various instances. More specifically, managing execution of the usecase may include, at block 732, building the usecase by combining the plurality of applications, including setting up connections between usecase child instances corresponding to the plurality of applications.

In one embodiment, building the usecase can include obtaining the usecase child instances. Obtaining the child instances can include loading child instances and connections between the child instances in-memory, and determining whether all the usecase child instances are present. If all the usecase child instances are present, no child instances need to be generated and thus connections between the present usecase child instances can be set up. Otherwise, one or more usecase child instances can be generated. The one or more usecase child instances can be generated based on spawn type (e.g., "dynamic", "new", "reuse", "uniqueSiteWide", "uniqueNodeWide").

The connections between the usecase child instances can be set up by stitching the child instances together so that they can talk to each other. The runtime system can be configured to iterate over all the connections and set the connections one-by-one. Moreover, the connections between the usecase child instances can be set up based on spawn type. For example, if the spawn type is "dynamic", the connection is skipped.

Managing execution of the usecase may further include, at block 734, executing the usecase by executing the usecase child instances to provide the micro-services. Since the child instances are connected and thus work together and talk to each other, each child instance may start producing its result or output and can provide the output as an input to the connected child instance. Accordingly, the entire usecase can be set into action by the runtime system.

Managing execution of the usecase may further include, at block 736, setting up a handler to terminate execution of the usecase and, at block 738, determining that the usecase should be stopped after a predefined time interval based on a signal received by the handler. For example, the runtime system can be put to sleep for a predetermined time interval and, after the runtime system wakes up, the runtime system can determine that it has received a signal to stop the usecase. In one embodiment, the signal received by the handler includes a SIGTERM. If the runtime system has received the signal, it will stop or terminate the usecase and delete the usecase child instances at block 740. Otherwise, the runtime system will go back to sleep for the predefined time interval.

Further details regarding blocks 730-740 are described above with reference to FIGS. 4-6.

As will be described in further detail below with reference to FIGS. 8-11, managing execution of the usecase can include serving an on-demand query and dynamically scaling resources based on the on-demand query using a batch helper application instance implemented by a batch helper server. The batch helper server is configured to use the usecase specification to load all application instances and their connections, and use a batch helper configuration to load all nodes/machines for execution of the on-demand query.

Figure 8:
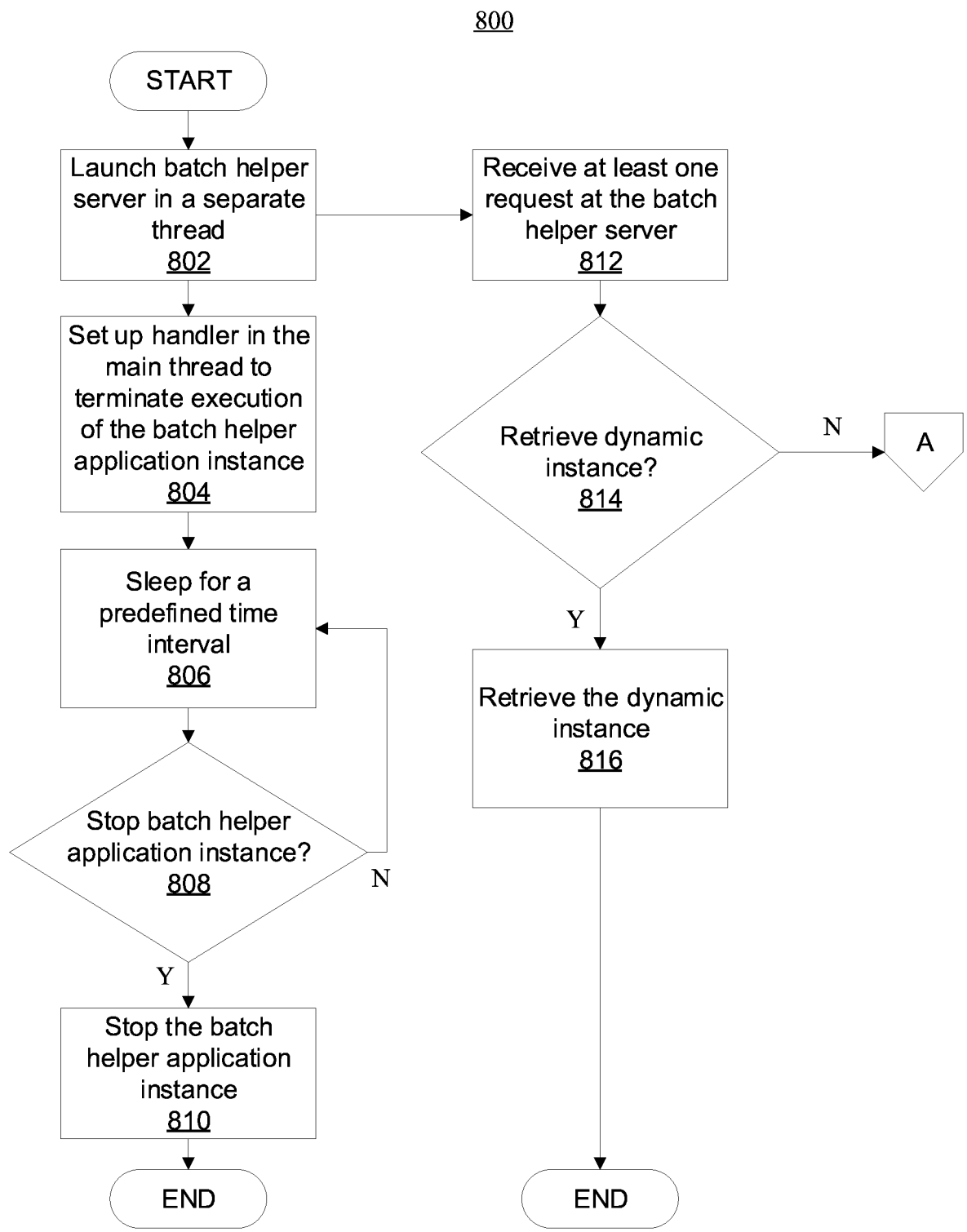
FIG. 8 is a block/flow diagram of a system/method for implementing a batch helper execution procedure to serve on-demand queries and dynamically scale resources, in accordance with an embodiment of the present invention.
Figure 8:
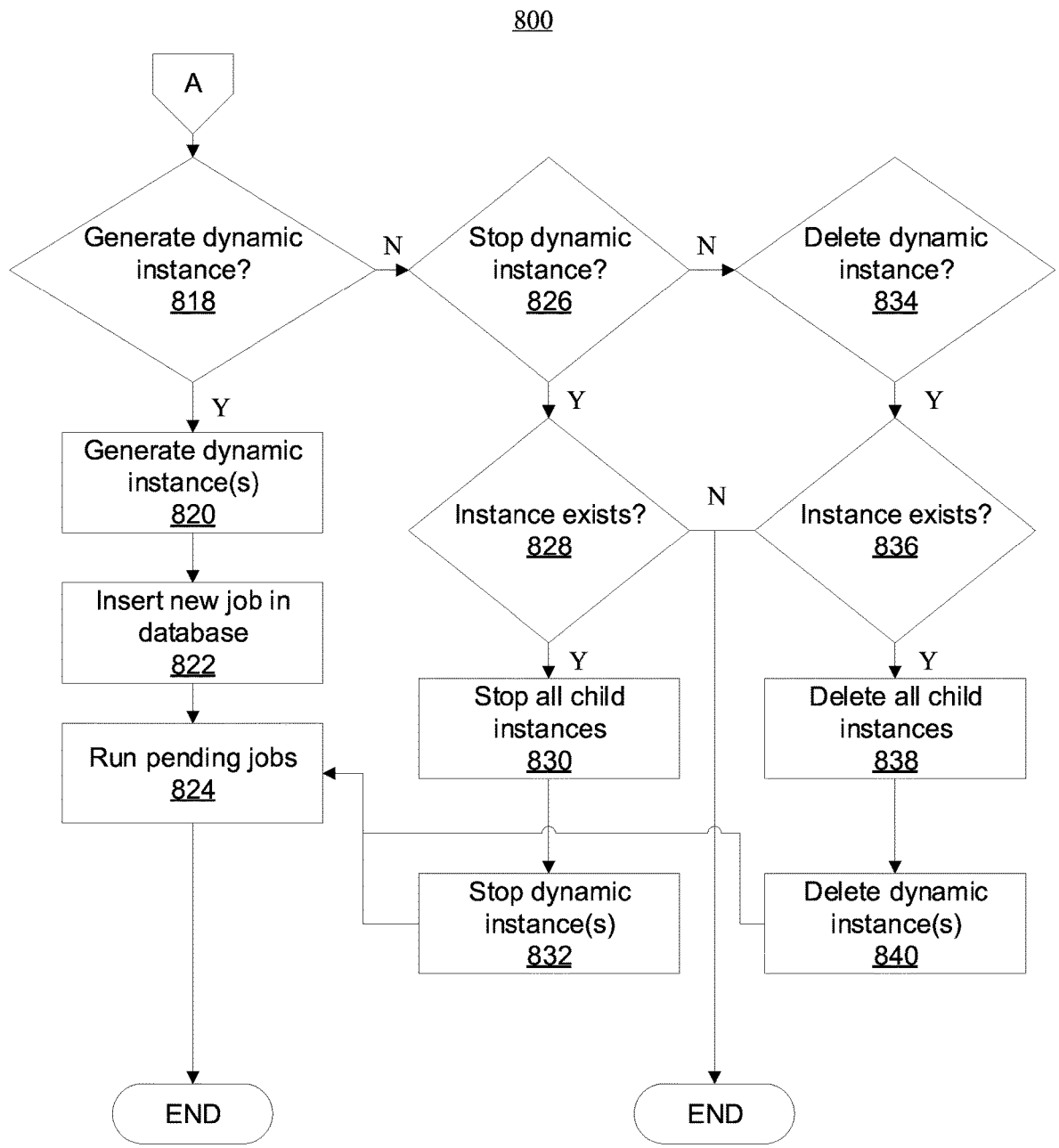

With reference to FIG. 8, a block/flow diagram is provided illustrating a system/method 800 for serving an on-demand query and dynamically scaling resources based on the on-demand query using a batch helper application instance. The system/method 800 can be performed as part of usecase execution management, as described above with reference to FIGS. 4-7.

At block 802, a batch helper server can be launched in a separate thread in response to execution of the batch helper application instance. The separate thread is a thread that is separate from a main thread. The batch helper server serves on-demand query requests. The batch helper server uses the usecase specification to load all the application instances and their connections, including dynamic connections and uses the batch helper configuration to load all the compute node(s)/machine(s) for execution of the on-demand queries.

Once the batch helper server is started in a separate thread, at block 804, a handler can be set up in the main thread to terminate execution of the batch helper application instance.

At block 806, the main thread is put to sleep for a predefined time interval.

When the main thread wakes up, at block 808, it is determined whether the batch helper application instance should be stopped after the predefined time interval. More specifically, the main thread determines if it has received a signal (e.g., SIGTERM signal) from the handler to stop the batch helper application instance.

If not, the system/method 800 reverts back to block 806 to put the main thread back to sleep for the predefined time interval. Otherwise, at block 810, the batch helper application instance is stopped. Stopping the batch helper application instance can further include stopping dynamic instances.

At block 812, a batch helper server receives at least one request. The request can include one or more requests to retrieve/generate/stop/delete at least one dynamic instance. The request can originate from another application instance within the topology generated when the usecase execution started or as dynamic instances after the start of usecase execution.

The batch helper server handles all requests related to dynamic instances. When the batch helper starts, it uses the usecase specification to load all the instances, including dynamic instances and the connections between them, and it uses the configuration to load all the compute nodes to execute dynamic instances to serve on-demand queries. This information may be enough for the batch helper server to handle all requests.

At block 814, the batch helper server determines if a particular dynamic instance exists. If so, at block 814, the batch server retrieves details of the particular dynamic instance or all children of the particular dynamic instance.

Otherwise, the system/method 800 proceeds to block 818 to determine whether the request is to generate a dynamic instance. Details related to the dynamic instance, including its configuration, can be received by the batch helper server as part of the request. As per the need of the query, dynamic scaling can be achieved by either generating and running several dynamic instances of the application or increasing resource usage of an individual dynamic instance.

If the request is to generate a dynamic instance, the dynamic instances is generated at block 820, a new job is inserted into a database or job pool at block 822, and pending jobs are run at block 824. The batch helper server runs any pending jobs in the job pool at block 824. Further details regarding running the pending jobs at block 824 are described below with reference to FIG. 9.

Figure 9:
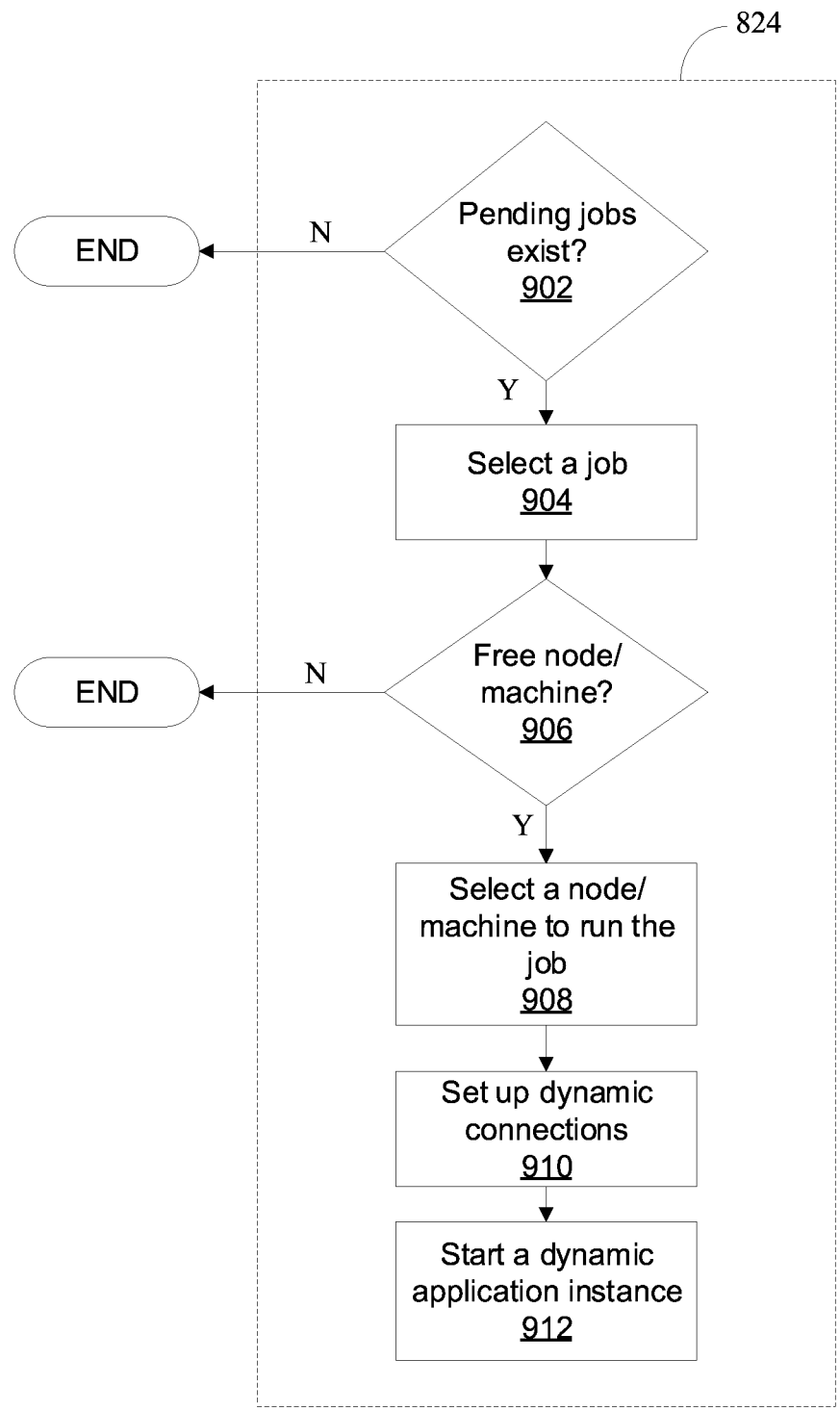
FIG. 9 is a block/flow diagram of a system/method for running pending jobs during the batch helper execution procedure of FIG. 8, in accordance with an embodiment of the present invention.

With reference to FIG. 9, a block/flow diagram is provided illustrating a system/method for running pending jobs at block 824 of FIG. 8.

At block 902, it is determined if any pending jobs exist. If not, the batch helper server ends serving the request. However, if any pending jobs exist, then the batch helper server can select a job from the job pool at block 904. In one embodiment, the job is selected as the oldest job from the job pool, such that jobs can be served in a first-in first-out (FIFO) order. However, such an embodiment should not be considered limiting, and the jobs in the job pool can be served in any suitable order in accordance with the embodiments described herein.

Once a job is selected to be served, at block 906, the batch helper server determines if at least one free node/machine exists to run the selected job. Only nodes/machines belonging to the nodes/machines assigned to batch helper application instance as part of its configuration are checked. If there are no free nodes/machines to run the job, then the batch helper server ends serving the request and the job remains in a pending state.

Otherwise, the batch helper server selects a node/machine to run the job at block 908. In one embodiment, one job can be assigned to a particular node/machine at a given point in time. However, such an embodiment should not be considered limiting, and different constraints for total number of jobs/resources per node that can be consumed can be set in accordance with the embodiments described herein.

In one embodiment, the batch helper server can select the node/machine in a round-robin manner. However, such an embodiment should not be considered limiting, and the batch helper server can select the node/machine to run the job using any suitable methodology in accordance with the embodiments described herein.

At block 910, the batch helper server sets up all the dynamic connections for running the job. The various dynamic connections can be pre-loaded during initialization based on the usecase specification.

At block 912, the batch helper server starts a dynamic application instance for running the pending job. The system/method 900 then reverts back to block 902 to determine if any other pending jobs exist.

Referring back to FIG. 8, if the request is not to generate a dynamic instance, then the batch helper server determines if the request is to stop a dynamic instance at block 826. The dynamic instance to stop can be provided as part of the request.

If the request is to stop a dynamic instance, then the batch helper server determines if the dynamic instance exists at block 828. If not, there is nothing to be done and the batch helper server ends the request. Otherwise, at block 830, the batch helper server obtains all the child instances of the dynamic instance and stops them, since there is no point in having the child instance running without the parent instance. After stopping all the child instances, the batch helper server can then stop the dynamic instance that needs to be stopped at block 832. Once the dynamic instance is stopped, the system/method 800 can revert back to block 824 for the batch helper server to run any pending jobs from the job pool.

If the request is not to stop a dynamic instance, then the batch helper server determines if the request is to delete a dynamic instance at block 834. The dynamic instance to be deleted can be provided as part of the request to the batch helper server.

If the request is to stop a dynamic instance, then the batch helper server determines if the dynamic instance exists. If not, there is nothing to be done and the batch helper server ends the request. Otherwise, at block 836, the batch helper server obtains all the child instances of the dynamic instance and deletes them, since there is no point in having the child instance running without the parent instance. After deleting all the child instances, the batch helper server can then delete the dynamic instance that needs to be deleted at block 838. Once the dynamic instance is deleted, the system/method 800 can revert back to block 824 for the batch helper server to run any pending jobs from the job pool.

The embodiments described herein can be employed within a variety of real-world environments to perform tasks or solve problems.

In one example, the embodiments described herein can be employed within a facial recognition system for monitoring individuals in a watchlist based on image data (e.g., video streams) obtained from a camera. The facial recognition system can be configured to generate an alert when an individual has a face that matches facial data (e.g., pre-registered facial data) in the watchlist.

In another example, the embodiments described herein can be employed to within an age and gender detection system to detect the age and gender of individuals based on image data (e.g., video streams) obtained from a camera.

Figure 10:
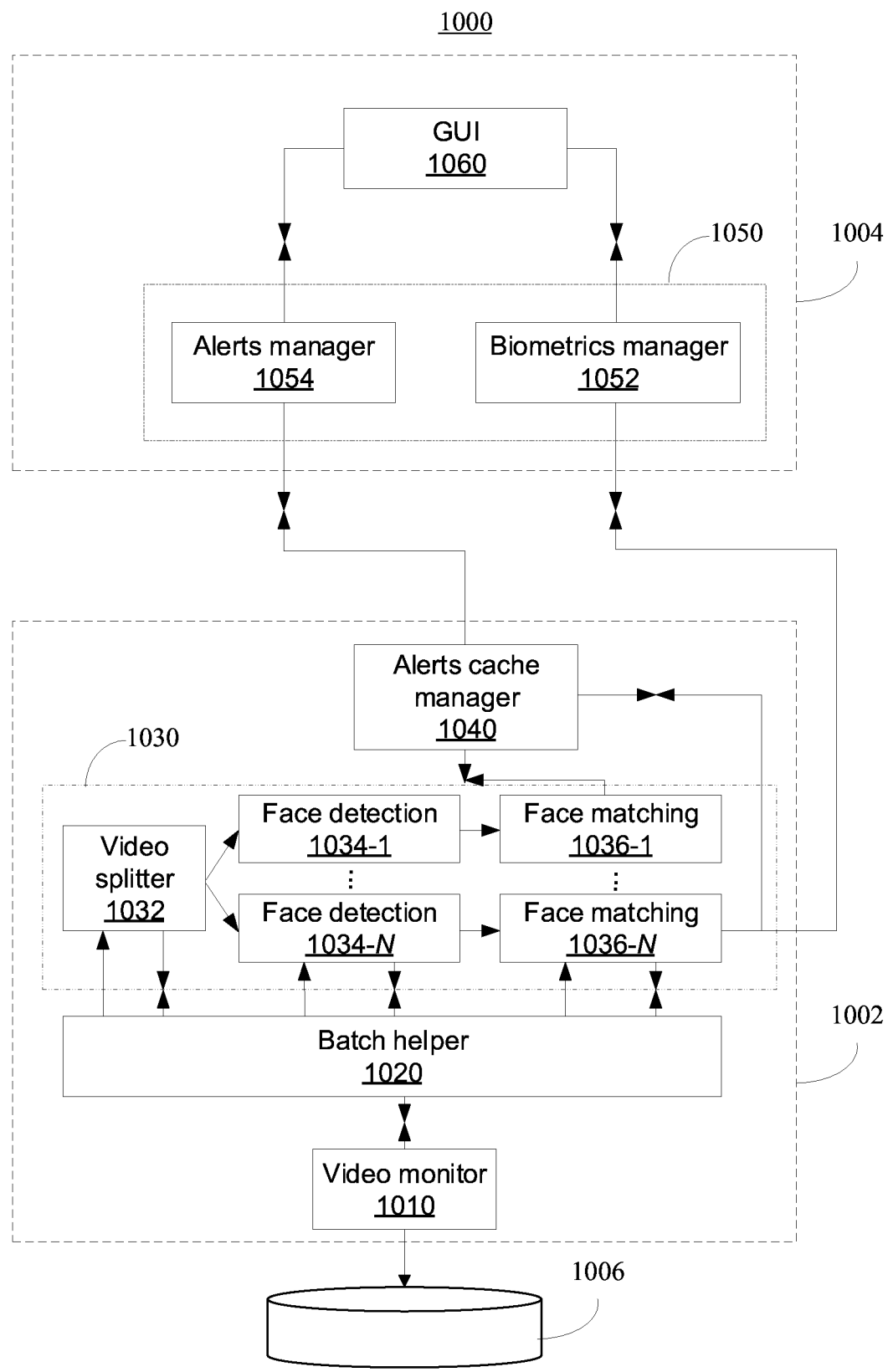
FIG. 10 is a block/flow diagram of an example of a system configured to implement a batch helper execution procedure, in accordance with an embodiment of the present invention.

With reference to FIG. 10, a block/flow diagram is provided illustrating an exemplary system 1000 configured to implement a batch helper execution procedure. The system 1000 in this illustrative example includes a facial recognition system including a batch helper to manage generation, connection, execution and termination of dynamic instances to process video files. Multiple video files can be added, each representing an on-demand query, and the batch helper serves these on-demand queries and dynamically scales resources as per the need of the query. Illustratively, the system 1000 can be used to process multiple video files depicting a crime scene to identify one or more criminals from a watchlist of criminals.

As shown, the system 1000 can include a worker node 1002, a master node 1004 and video file storage 1006. The worker node 1002 and the master node 1004 can each include a plurality of applications for performing facial recognition based on data stored in the video file storage 1006.

More specifically, the worker node 1002 can include a video monitor 1010, a batch helper 1020, a set of applications 1030 including a video splitter 1032, face detection applications 1034-1 through 1034-N, and face matching applications 1036-1 through 1036-N, and an alerts cache manager 1040. Instances of the video monitor and batch helper 1010 and 1020 can have a "New" spawn type. Instances of the set of applications 1030 can have a "Dynamic" spawn type. An instance of the alerts cache manager 1040 can have a "uniqueNodeWide" spawn type and gets shared because it has the same configuration and same worker node 1002. The worker node 1002 can have more shared instances, if there are more usecases instances to run. Additionally, there could be multiple such workers in a deployment.

The master node 1004 can include a set of applications 1050 including a biometrics manager 1052, an alerts manager 1054, and a graphical user interface (GUI) application 1060. Instances of the biometrics and alerts managers 1052 and 1054 have a "uniqueSiteWide" spawn type and thus get shared across site-wide deployment. An instance of the GUI application 960 can also have a "uniqueSiteWide" spawn type.

To perform facial recognition in the system 1000, the video monitor 1010 is in communication with the video file storage 1006 and the batch helper 1020. An instance of the video monitor 1010 monitors for addition of video files in the video file storage 1006 and informs the batch helper 1020 to initiate an instance of the video splitter 1032 whenever a new file is added/uploaded. The processing status of video files can be maintained and updated by the video monitor 1010. The addition of a video file corresponds to an on-demand query in this example.

An instance of the batch helper 1020 (which exposes the endpoint to manage dynamic instances) manages execution of dynamic instances, including generating dynamic instances, scheduling dynamic instances, connecting dynamic instances, and terminating dynamic instances after processing is completed. The batch helper 1020 generates and schedules an instance of the video splitter 1032 on the same worker or different worker based on available resources.

An instance of the video splitter 1032 informs the batch helper 1020 to generate dynamic instances of face detection applications 1034-1 through 1034-N to detect faces in the newly added video file. The video splitter 1032 further retrieves the video file from the video file storage 1006, splits the video file into file chunks and provides the file chunks to the instances of the face detection applications 1034-1 through 1034-N for parallel processing. The number of face detection instances that are dynamically generated can be determined based on video file size, and resources can be scaled as per the need of the query to process the file chunks in parallel. For example, a smaller video file with fewer video chunks will require fewer face detection instances than a larger video file. This can be dynamically adjusted as per the need of the query (e.g., depending on the size of the video file and available resources). The batch helper 1020 can dynamically generate and schedule the instances of the face detection applications 1034-1 through 1034-N on the same worker or different worker based on available resources.

For every instance of the face detection applications 1034-1 through 1034-N, the batch helper 1020 can dynamically generate and schedule a corresponding face matching instance 1036-1 through 1036-N on the same worker or on different workers based on available resources. The face matching applications 1036-1 through 1036-N receive detected faces from respective ones of the face detection applications 1034-1 through 1034-N, match the detected faces with a watchlist (e.g., by loading the watchlist information in-memory) and output matched face information. The biometrics manager 1052 (which exposes the endpoint to manage the watchlist) maintains watchlist information including names and pictures of people to be monitored/watched.

An instance of the alerts cache manager 1040 (which exposes the endpoint to manage local alerts on the worker node 1004) receives the matched face information output by each of the face matching instances 1036-1 through 1036-N, connects to the alerts manager 1054 to post all alerts on the worker node 1004, maintains the alerts in cache and retries if there is no network activity while posting alerts. The alerts manager 1054 (which exposes the endpoint to manage site-wide alerts) maintains matched alerts information. The batch helper 1020 terminates the dynamic instances from the set 1030 when the video file processing ends. An instance of the GUI application 1060 retrieves information from the instances of the biometrics manager 1052 and/or the alerts managers 1054, and can display real-time results to one or more end-users.

With reference to FIG. 11, a block/flow diagram is provided illustrating a system/method 1100 for managing execution of a usecase.

At block 1110, a usecase specification and usecase runtime specification corresponding to a usecase are obtained, with the usecase including a plurality of applications each being associated with a micro-service providing a corresponding functionality within the usecase for performing a task.

At block 1120, execution of the usecase within a runtime system is managed based on the usecase and usecase runtime specifications to perform the task by serving an on-demand query and dynamically scaling resources based on the on-demand query. More specifically, managing execution of the usecase can include, at block 1122, using a batch helper server to employ the usecase specification to load dynamic application instances and connect the dynamic application instances to existing instances and, at block 1124, using the batch helper server to employ a batch helper configuration to load nodes/machines for execution of the on-demand query. The existing instances can include static and/or dynamic instances.

Further details regarding blocks 1110-1122 are described above with reference to FIGS. 2, 3 and 7-10.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
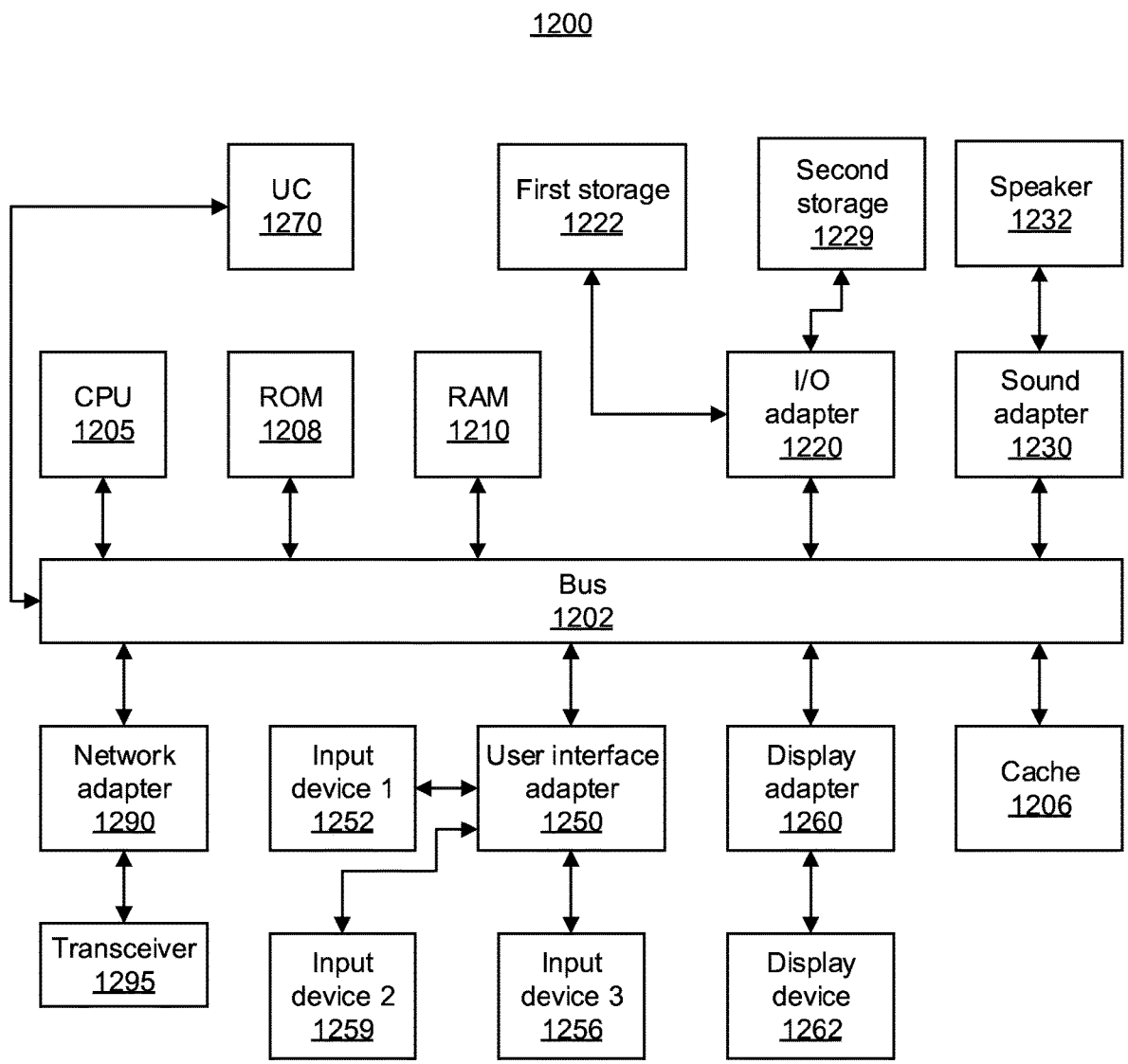
FIG. 12 is a block/flow diagram illustrating a computer system, in accordance with an embodiment of the present invention.

Referring now to FIG. 12, an exemplary computer system 1200 is shown which may represent a server or a network device, in accordance with an embodiment of the present invention. The computer system 1200 includes at least one processor (CPU) 1205 operatively coupled to other components via a system bus 1202. A cache 1206, a Read Only Memory (ROM) 1208, a Random-Access Memory (RAM) 1210, an input/output (I/O) adapter 1220, a sound adapter 1230, a network adapter 1290, a user interface adapter 1250, and a display adapter 1260, are operatively coupled to the system bus 1202.

A first storage device 1222 and a second storage device 1229 are operatively coupled to system bus 1202 by the I/O adapter 1220. The storage devices 1222 and 1229 can be any of a disk storage device (e.g., a magnetic or optical disk storage device), a solid state magnetic device, and so forth. The storage devices 1222 and 1229 can be the same type of storage device or different types of storage devices.

A speaker 1232 may be operatively coupled to system bus 1202 by the sound adapter 1230. A transceiver 1295 is operatively coupled to system bus 1202 by network adapter 1290. A display device 1262 is operatively coupled to system bus 1202 by display adapter 1260.

A first user input device 1252, a second user input device 1259, and a third user input device 1156 are operatively coupled to system bus 1202 by user interface adapter 1250. The user input devices 1252, 1259, and 1256 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1252, 1259, and 1256 can be the same type of user input device or different types of user input devices. The user input devices 1252, 1259, and 1256 are used to input and output information to and from system 1200.

Usecase (UC) component 1270 may be operatively coupled to system bus 1202. UC component 1270 is configured to perform one or more of the operations described above. UC component 1270 can be implemented as a standalone special purpose hardware device, or may be implemented as software stored on a storage device. In the embodiment in which UC component 1270 is software-implemented, although shown as a separate component of the computer system 1200, UC component 1270 can be stored on, e.g., the first storage device 1222 and/or the second storage device 1229. Alternatively, UC component 1270 can be stored on a separate storage device (not shown).

Of course, the computer system 1200 may also include other elements (not shown), as readily contemplated by one of skill in the art, as well as omit certain elements. For example, various other input devices and/or output devices can be included in computer system 1200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1200 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method comprising:
obtaining a usecase specification and a usecase runtime specification corresponding to the usecase, the usecase including a plurality of applications each being associated with a micro-service providing a corresponding functionality within the usecase for performing a task; and
managing execution of the usecase within a runtime system based on the usecase and usecase runtime specifications to perform the task by serving an on-demand query and dynamically scaling resources based on the on-demand query, including using a batch helper server to:
employ the usecase specification to load dynamic application instances and connect the dynamic application instances to existing instances; and
employ a batch helper configuration to load nodes/machines for execution of the on-demand query.

2. The method of claim 1, wherein:
obtaining the usecase specification further includes specifying the usecase by specifying:
data associated with the usecase, the data associated with the usecase including a usecase identifier, a usecase name and usecase metadata;
application dependencies and application instances; and
instance connections; and
obtaining the usecase runtime specification further includes specifying usecase execution by specifying:
the usecase identifier;
an instance name;
a usecase node/machine; and
a usecase configuration.

3. The method of claim 1, further comprising:
launching the batch helper server in a separate thread from a main thread;
setting up a handler in the main thread to terminate execution of the batch helper application instance;
putting the main thread to sleep for a predefined time interval;
determining that the batch helper application instance should be stopped after the predefined time interval by determining if the main thread has received a signal from the handler to stop the batch helper application instance; and
stopping the batch helper application instance.

4. The method of claim 1, wherein serving the on-demand query and dynamically scaling resources based on the on-demand query using the batch helper application instance further includes:
receiving, from another application instance, a request at the batch helper server to perform an action associated with at least one dynamic instance; and
performing the action in response to the request.

5. The method of claim 4, wherein the request includes a request to retrieve the at least one dynamic instance, and wherein performing the action in response to the request includes:
determining that the at least one dynamic instance exists; and
retrieving details of the at least one dynamic instance or all children of the at least one dynamic instance.

6. The method of claim 4, wherein the request includes a request to generate the at least one dynamic instance, and wherein performing the action in response to the request includes:
generating the at least one dynamic instance; and
inserting a new job into a job pool; and
running any pending jobs in the job pool, including:
selecting a pending job from the job pool;
determining that at least one node/machine assigned to the batch helper application instance exists to run the pending job;
selecting the at least one node/machine assigned to the batch helper instance to run the pending job;
setting up all dynamic connections for running the pending job; and
starting a dynamic application instance for running the pending job.

7. The method of claim 4, wherein the request includes a request to stop the at least one dynamic instance, and wherein performing the action in response to the request includes:
determining that the at least one dynamic instance exists; and
stopping all child instances of the at least one dynamic instance; and
stopping the at least one dynamic instance.

8. The method of claim 4, wherein the request includes a request to delete the at least one dynamic instance, and wherein performing the action in response to the request includes:
determining that the at least one dynamic instance exists; and deleting all child instances of the at least one dynamic instance; and deleting the at least one dynamic instance.

9. The method of claim 1, wherein managing execution of the usecase within the runtime system further includes:

building the usecase by combining the plurality of applications, including setting up connections between usecase child instances corresponding to the plurality of applications;

executing the usecase, including executing the usecase child instances to provide the micro-services;

setting up a handler for terminating execution of the usecase;

determining that the usecase should be stopped after a predetermined time interval based on a signal received by the handler;

stopping the usecase; and in response to execution of the usecase abruptly failing, resuming operation by reusing previously existing child instances.

10. A computer program product comprising a non-transitory computer readable storage medium having program instructions embodied therewith, the program instructions executable by a computer to cause the computer to perform a method comprising:

obtaining a usecase specification and a usecase runtime specification corresponding to the usecase, the usecase including a plurality of applications each being associated with a micro-service providing a corresponding functionality within the usecase for performing a task; and managing execution of the usecase within a runtime system based on the usecase and usecase runtime specifications to perform the task by serving an on-demand query and dynamically scaling resources based on the on-demand query, including using a batch helper server to:

employ the usecase specification to load dynamic application instances and connect the dynamic application instances to existing instances; and employ a batch helper configuration to load nodes/machines for execution of the on-demand query.

11. The computer program product of claim 10, wherein:

obtaining the usecase specification further includes specifying the usecase by specifying:

data associated with the usecase, the data associated with the usecase including a usecase identifier, a usecase name and usecase metadata;

application dependencies and application instances; and instance connections; and obtaining the usecase runtime specification further includes specifying usecase execution by specifying:

the usecase identifier;

an instance name;

a usecase node/machine; and a usecase configuration.

12. The computer program product of claim 10, wherein the method further includes:

launching the batch helper server in a separate thread from a main thread;

setting up a handler in the main thread to terminate execution of the batch helper application instance;

putting the main thread to sleep for a predefined time interval;

determining that the batch helper application instance should be stopped after the predefined time interval by determining if the main thread has received a signal from the handler to stop the batch helper application instance; and stopping the batch helper application instance.

13. The computer program product of claim 10, wherein serving the on-demand query and dynamically scaling resources based on the on-demand query using the batch helper application instance further includes:

receiving, from another application instance, a request at the batch helper server to perform an action associated with at least one dynamic instance; and performing the action in response to the request.

14. The computer program product of claim 13, wherein the request includes a request to retrieve the at least one dynamic instance, and wherein performing the action in response to the request includes:

determining that the at least one dynamic instance exists; and retrieving details of the at least one dynamic instance or all children of the at least one dynamic instance.

15. The computer program product of claim 13, wherein the request includes a request to generate the at least one dynamic instance, and wherein performing the action in response to the request includes:

generating the at least one dynamic instance; and inserting a new job into a job pool; and running any pending jobs in the job pool, including:

selecting a pending job from the job pool;

determining that at least one node/machine assigned to the batch helper application instance exists to run the pending job;

selecting the at least one node/machine assigned to the batch helper instance to run the pending job;

setting up all dynamic connections for running the pending job; and starting a dynamic application instance for running the pending job.

16. The computer program product of claim 13, wherein the request includes a request to stop the at least one dynamic instance, and wherein performing the action in response to the request includes:

determining that the at least one dynamic instance exists; and stopping all child instances of the at least one dynamic instance; and stopping the at least one dynamic instance.

17. The computer program product of claim 13, wherein the request includes a request to delete the at least one dynamic instance, and wherein performing the action in response to the request includes:

determining that the at least one dynamic instance exists; and deleting all child instances of the at least one dynamic instance; and deleting the at least one dynamic instance.

18. The computer program product of claim 9, wherein managing execution of the usecase within the runtime system further includes:

building the usecase by combining the plurality of applications, including setting up connections between usecase child instances corresponding to the plurality of applications;

executing the usecase, including executing the usecase child instances to provide the micro-services;

setting up a handler for terminating execution of the usecase;

determining that the usecase should be stopped after a predetermined time interval based on a signal received by the handler;

stopping the usecase; and in response to execution of the usecase abruptly failing, resuming operation by reusing previously existing child instances.

19. A system comprising:

a memory device for storing program code; and at least one processor device operatively coupled to a memory device and configured to execute program code stored on the memory device to:

obtain a usecase specification and a usecase runtime specification corresponding to the usecase, the usecase including a plurality of applications each being associated with a micro-service providing a corresponding functionality within the usecase for performing a task; and manage execution of the usecase within a runtime system based on the usecase and usecase runtime specifications to perform the task by serving an on-demand query and dynamically scaling resources based on the on-demand query by using a batch helper server to:

employ the usecase specification to load dynamic application instances and connect the dynamic application instances to existing instances; and employ a batch helper configuration to load nodes/machines for execution of the on-demand query.

20. The system of claim 19, wherein:

the at least one processor device is further configured to execute program code stored on the memory device to:

launch the batch helper server in a separate thread from a main thread;

set up a handler in the main thread to terminate execution of the batch helper application instance;

put the main thread to sleep for a predefined time interval;

determine that the batch helper application instance should be stopped after the predefined time interval by determining if the main thread has received a signal from the handler to stop the batch helper application instance; and stopping the batch helper application instance; and the at least one processor device is further configured to serve the on-demand query and dynamically scale resources based on the on-demand query using the batch helper application instance by:

receiving, from another application instance, a request at the batch helper server to perform an action associated with at least one dynamic instance, the request including a request selected from the group consisting of: retrieve the at least one dynamic instance, generate the at least one dynamic instance, stop the at least one dynamic instance, and delete the at least one dynamic instance; and performing the action in response to the request.

* * * * *